June 24, 1930.                W. H. BURRY                1,767,048
                             WAVE POWER PLANT
                           Filed June 7, 1928          2 Sheets-Sheet 1
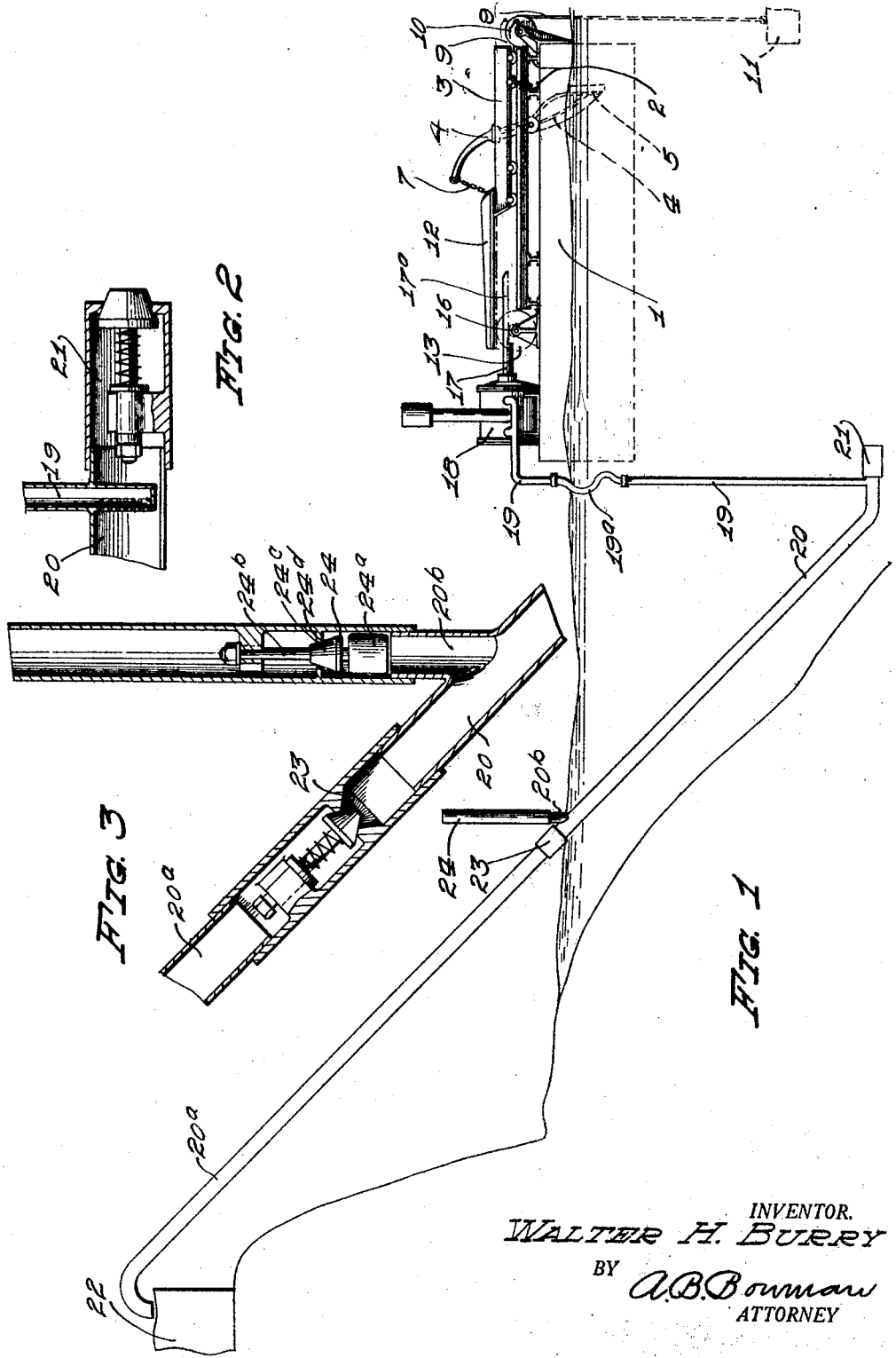
INVENTOR.
WALTER H. BURRY
BY A.B.Bowman
ATTORNEY

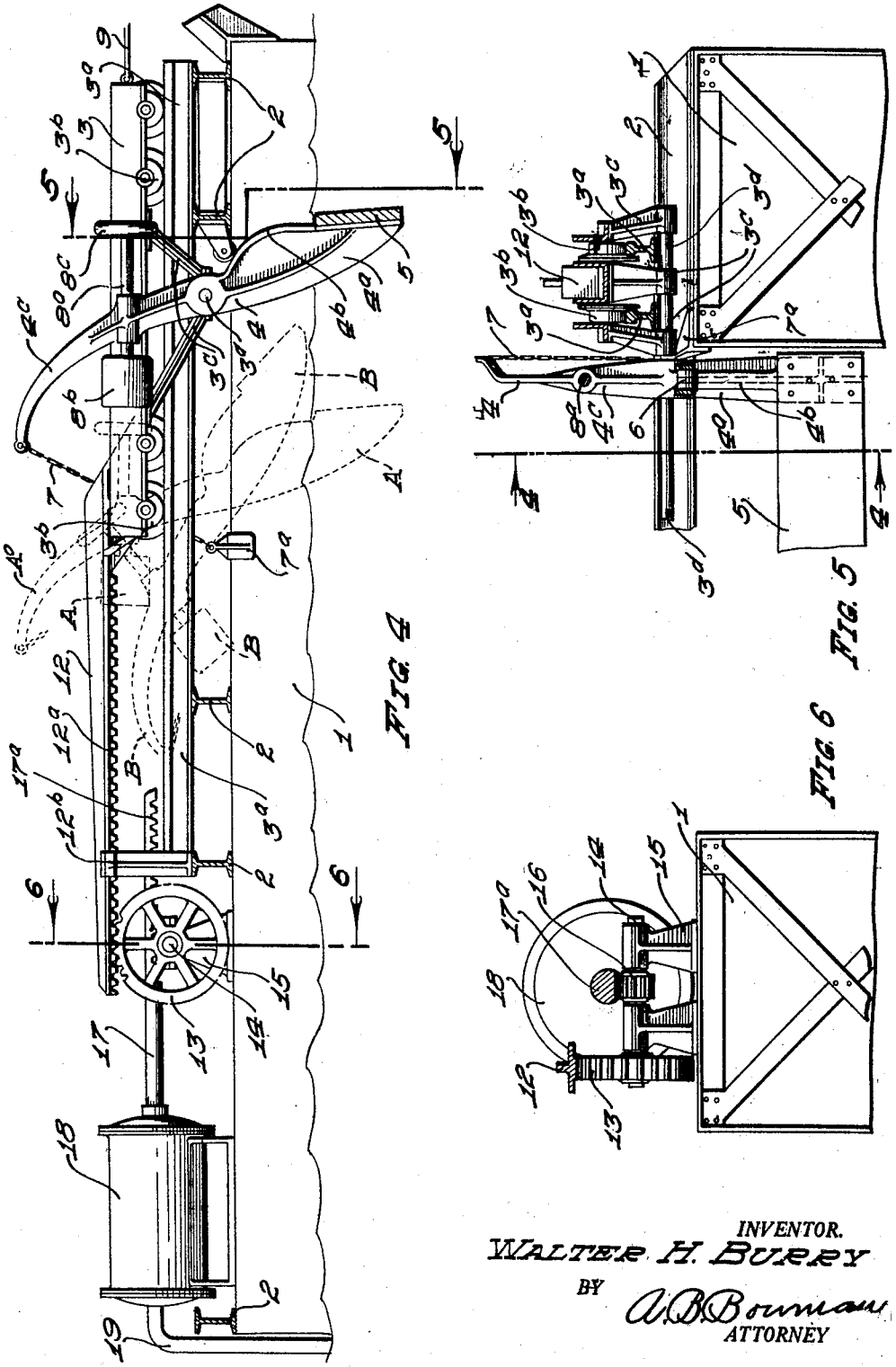

Patented June 24, 1930

1,767,048

UNITED STATES PATENT OFFICE

WALTER H. BURRY, OF EL CAJON, CALIFORNIA

WAVE POWER PLANT

Application filed June 7, 1928. Serial No. 283,575.

My invention relates to wave actuated power plants and the objects of my invention are: first, to provide an apparatus of this class whereby the force of waves formed on bodies of water is made to compress air which in turn is used to pump water into an elevated reservoir where the potential energy of said water due to its elevated position may be used in any suitable manner; second, to provide an apparatus of this class in which reciprocatable paddle members are actuated by the force of water waves; third, to provide an apparatus of this class in which there is a minimum number of moving parts all of which are relatively slow moving thereby reducing wear to a minimum; fourth, to provide an apparatus of this class in which wave force is made to produce compressed air needed to operate an air-lift pump having its intake in the body of water which produces the required wave force; fifth, to provide a novel wave actuated paddle means in connection with a wave power plant; sixth, to provide a novel air-lift pump mechanism especially adapted for use in connection with wave motors, and seventh, to provide on a whole a novel wave actuated power plant which is simple of construction, proportional to its functions, durable, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a diagrammatic view of my wave actuated power plant; Fig. 2 is an enlarged substantially diagrammatic sectional view of the intake portion of the air-lift pump mechanism which forms a part of my power plant; Fig. 3 is another enlarged substantially diagrammatic detailed sectional view of the air exhaust portion of the air-lift pump mechanism and an adjacent check valve mechanism; Fig. 4 is an enlarged substantially diagrammatic view of the wave motor mechanism and a compressor unit operated thereby taken through 4—4 of Fig. 5; Fig. 5 is a fragmentary transverse sectional view through 5—5 of Fig. 4, showing only one half or one side of the wave actuated mechanism, with parts and portions shown in elevation to facilitate the illustration, and Figure 6 is another fragmentary transverse sectional view through the line 6—6 of Fig. 4 with parts and portions in elevation to facilitate the illustration.

Similar characters of reference refer to similar parts and portions throughout the several views of the drawings.

Floats 1, cross beams 2, carriage mechanism 3, paddle arms 4, paddle impact plate 5, roller members 6, paddle tripping chain 7, paddle balancing means 8, return cable 9, return cable guide wheel 10, return cable weight 11, master rack member 12, master gear wheel 13, shaft 14, support 15, pinion gear 16, plunger rod 17, compressor 18, compressed air line 19, water lift pipe 20, water intake valve 21, reservoir 22, check valve 23, and air exhaust valve 24, constitute the principal parts and portions of my wave actuated power plant.

The wave motor mechanism of my power plant is supported by a pair of floats 1 which are securely anchored by any suitable means, not shown, which will permit only vertical movement of the float caused by the rise and fall of the tide. If desired piers may be used providing that the wave motor is kept at a constant relative position to the surface of the water. The pair of floats are rigidly secured in spaced relation by a plurality of cross beams 2. Mounted adjacent to the adjacent edges of these floats is a pair of rail members 3$^a$ which serve as a track for the carriage mechanism 3.

The carriage mechanism 3 is movably supported upon the rails 3$^a$ by means of flanged wheels 3$^b$ arranged in pairs at the forward and rear ends of the carriage. Suitable hangers or support means 3$^c$ extend downwardly from the central portion of each carriage 3 at the sides of and between the rails 3ª. A paddle arm support rod 3ᵈ extends between the floats 1 and is secured at its ends in the support or hanger members 3ᶜ.

Pivotally mounted upon the shaft 3ᵈ adjacent to the inner sides of each float 1 is a paddle arm 4. The paddle arm 4 is provided with a downwardly extending portion 4ª which is secured to one end of a paddle impact plate 5, the paddle impact plate 5 being supported at its ends between the two paddle arms. Immediately above the impact plate on the forward side of each downwardly extending portion 4ª of the paddle arm 4 is a cam means 4ᵇ which is engageable with a roller 6 supported by the cross beams 2. The said cam means, one to each paddle arm 4, simultaneously engage their respective rollers. The upwardly and backwardly extending portions 4ᶜ of each paddle arm 4 is secured at its extremity to a paddle tripping chain 7 which is secured by a bracket 7ª to the float 1.

Screwably mounted intermediate the ends of the upwardly extending portion 4ᶜ of the paddle arm 4 in a rearwardly extending hole therein is a screw member 8ª of the paddle balancing means 8. To the rear end of the screw 8ª is secured a weight 8ᵇ and to the forward end an adjusting wheel 8ᶜ. The screw member 8ª moves the weight 8ᵇ forwardly and rearwardly thereby adjusting the balance of the paddle arm.

Secured to the forward end of each carriage mechanism is a cable 9 which passes over a cable guide wheel 10 mounted by means of a bracket at the forward end of each float 1. The end of the cable 9 is secured to a suitable weight 11, as shown fragmentarily in Fig. 1 of the drawings.

A relatively long master rack member 12 is secured at its one end to the rear portion of the carriage mechanism 3. The rack 12 is provided with teeth on the under side thereof for a distance slightly greater than the stroke of the carriage member. A suitable guide bracket 12ᵇ is adapted to hold the extended end of the master rack 12 in position.

The rack 12 engages a master gear wheel 13 which is mounted on an axle 14 journaled in supports 15 which are secured to the float 1. A pinion gear 16 is secured to the shaft 14 and adapted to engage a rack 17ª of a plunger rod 17 which extends to a compressor 18 and secured to a suitable plunger, not shown.

The compressor 18 is relatively large and especially adapted to run at the low speed obtained by the hereinbefore described wave mechanism. The air from the compressor is conducted through the compressed air line 19 which has a flexible section 19ª therein to allow for the movement of the tide. The lower end of the compressed air line 19 extends into the lower end of a water lift pipe 20, and terminates in a plurality of small openings which discharge into said water lift pipe. The lower end of the pipe 20 is closed by a water intake valve 21 which is essentially a check valve that permits water to enter the pipe line 20 but prevents discharge therefrom, as shown best in Fig. 2 of the drawings. The pipe line 20 extends upwardly, away from the floats 1, and to a suitable elevated reservoir 22 which may be positioned upon the top of a cliff or other elevated land adjacent to the body of water which operates the wave motor mechanism, as shown in Fig. 1.

Intermediate the ends of the pipe 20 approximately level with the main pipe line is a check valve 23 which prevents water in the upper portion 20ª of the pipe 20 from returning between the strokes of the compressor.

My wave actuated power plant operates as follows: The floats 1 are positioned adjacent to a shore where the water is of a sufficient depth and a suitable elevated piece of land is close by. In cases where the water is shallow, a sump may be dug to receive the submerged end of the pipe 20. The waves in the body of water in which the floats 1 are positioned strike the paddle impact plate 5 causing the carriage mechanisms 3, there being one carriage mechanism to each float, to move rearwardly in the position shown by the first set of dotted lines, indicated by A, in Fig. 4 of the drawings. At this point the tripping chain 7 causes the paddle arm 4 to pivot about the shaft 3ᵈ causing the arm to assume the position shown by the second set of dotted lines, indicated by B, in Fig. 4 of the drawings.

As the paddle impact plate is now above the water, the weight 11 causes the carriage 3 to return to its normal position. In doing so the cams 4ᵇ, one on each paddle arm, engage the rollers 6 which pivot the paddle arms until the plunger impact plate is again in the water ready to receive the next wave impact. The reciprocation of the carriage mechanism causes a similar but shorter reciprocation of the plunger rod 17 of the compressor 18. The movement of the plunger rod 17 in the compressor 18 compresses air which is forced into the water lift pipe 20 where it mixes with the water therein creating a mixture of air and water which has a lower density than the surrounding water, which forces the mixture into the reservoir 22 where it may be used by any suitable power apparatus, not shown.

In the structure two compressors are operated, one mounted on either float, however, it is obvious that a plurality of compressors could be connected to the shaft 14 or that a plurality of wave motor mechanisms could be used to operate a single compressor.

Though I have shown and described a particular construction, combination and arrangement of parts and portions, I do not wish to be limited to this particular construction, combination and arragement, but desire to include in the scope of my invention the construction, combination and arrangement substantially as set forth in the appended claims.

Having thus described my invention, what I claim as new and desire to secure by Letters Patent is:

1. In an apparatus of the class described, a wave actuated mechanism including a reciprocable carriage mechanism, paddle arms connected thereto, a wave impact plate secured between said paddle arms, means for raising said water impact plate at the end of each reciprocation of said carriage mechanism, and other means for lowering said water impact plate at the other end of each reciprocation of said carriage mechanism.

2. In an apparatus of the class described, a wave actuated mechanism including a reciprocable carriage mechanism, paddle arms connected thereto, a wave impact plate secured between said paddle arms, means for raising said water impact plate at the end of each reciprocation of said carriage mechanism, other means for lowering said water impact plate at the other end of each reciprocation of said carriage mechanism, and means for transforming the energy produced by the reciprocation of the carriage of said wave actuated mechanism into usable power.

3. In an apparatus of the class described, a wave actuated mechanism including a pair of reciprocable carriage mechanisms mounted on supporting means in close proximity and approximately constant relation to the surface of a body of water, paddle means movable with said carriage mechanisms, and means for shifting said paddle means out of and into engagement with the surface of said body of water at the end and the beginning respectively of each reciprocation of said carriage mechanisms.

4. In an apparatus of the class described, a wave actuated mechanism including a pair of reciprocable carriage mechanisms mounted on supporting means in close proximity and approximately constant relation to the surface of a body of water, paddle means movable with said carriage mechanisms, and means for shifting said paddle means out of and into engagement with the surface of said body of water at the end and the beginning respectively of each reciprocation of said carriage mechanisms, and means for transforming the energy produced by the reciprocation of said carriage mechanism into usable power.

5. In an apparatus of the class described, a wave actuated mechanism including a pair of reciprocable carriage mechanisms mounted on supporting means in close proximity and approximate relation to the surface of a body of water, paddle means movable with said carriage mechanisms, and means for shifting said paddle means out of and into engagement with the surface of said body of water at the end and the beginning respectively of each reciprocation of said carriage mechanisms, said wave actuated mechanism adapted to be propelled in one direction by wave force and in the return direction by a portion of the power accumulated by the wave propelled stroke of said wave actuated mechanism.

In testimony whereof, I have hereunto set my hand at El Cajon, California, this 28th day of May, 1928.

WALTER H. BURRY.